United States Patent [19]

Postel et al.

[11] 4,314,351

[45] Feb. 2, 1982

[54] CURVE-GENERATING DEVICE FOR VISUAL DISPLAY OF SYMBOLS ON A CATHODE-RAY SCREEN

[75] Inventors: Michel Postel; Jean-Pierre Bouron, both of Paris, France

[73] Assignee: Thomson-CSF, Paris, France

[21] Appl. No.: 115,885

[22] Filed: Jan. 28, 1980

[30] Foreign Application Priority Data

Jan. 30, 1979 [FR] France ............................... 79 02281

[51] Int. Cl.³ ............................................. G06F 3/153

[52] U.S. Cl. .................................... 364/720; 340/732; 340/739; 364/719

[58] Field of Search ........................ 364/719, 720, 723; 340/732, 739

[56] References Cited

U.S. PATENT DOCUMENTS

| | | | |
|---|---|---|---|
| 3,696,391 | 10/1972 | Peronneau | 340/324 |
| 3,728,528 | 4/1973 | Walters | 364/720 |
| 3,921,163 | 11/1975 | Giraud et al. | 340/324 |
| 4,023,027 | 5/1977 | Strathman et al. | 364/720 |
| 4,115,863 | 9/1978 | Brown | 364/719 X |

*Primary Examiner*—Jerry Smith

*Attorney, Agent, or Firm*—Oblon, Fisher, Spivak, McClelland & Maier

[57] ABSTRACT

The curve-generating device serves in particular to produce signals relating to a circular line from simple algorithms. The device comprises means for computing a parameter ΔL defined by $$R = \frac{U + \Delta L}{\theta} \text{ and } O \leqq \Delta L < U$$

where U is an elementary vector, $\theta$ is the angle at the center of a polygon of side U+ΔL circumscribed about the circle R, and processing logic circuits for determining the polar direction $P_n$ of the plotted line according to the relation:

$$P_n = \theta_{n-1} + \theta \cdot \bar{\Delta}_{n-1} \cdot \left[ 1 - \frac{x_{n-1}}{U} \right],$$

where $\Delta_{n-1}=1$ in respect of $x_{n-1} \geqq U$ and $x_n = x_{n-1} + \Delta L \cdot \bar{\Delta}_{n-1} - U \cdot \Delta_{n-1}$.

10 Claims, 6 Drawing Figures

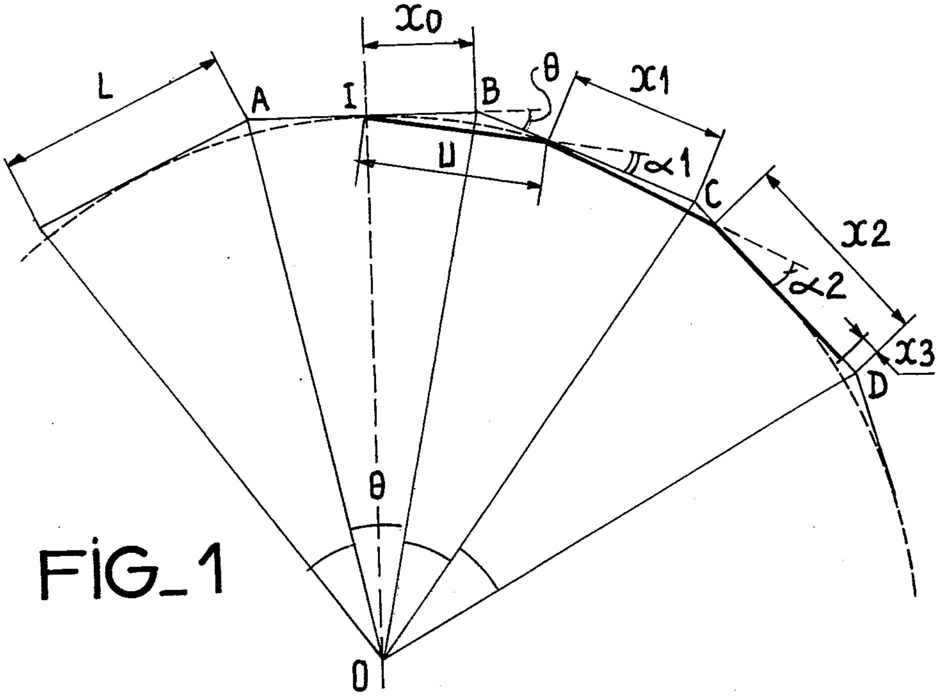
FIG_1
FIG_2
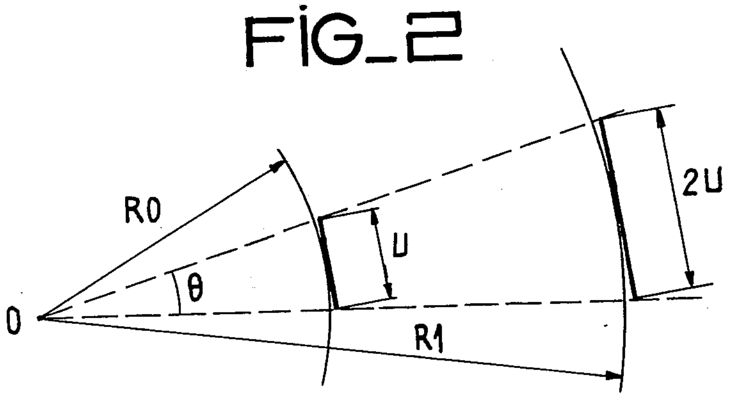
FIG_3
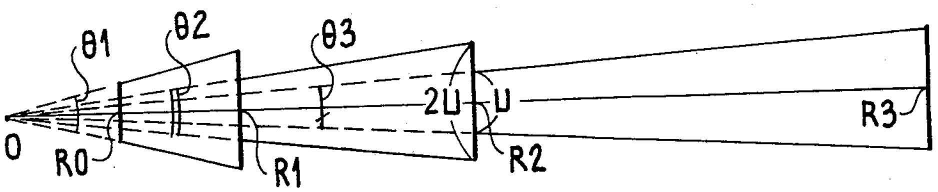

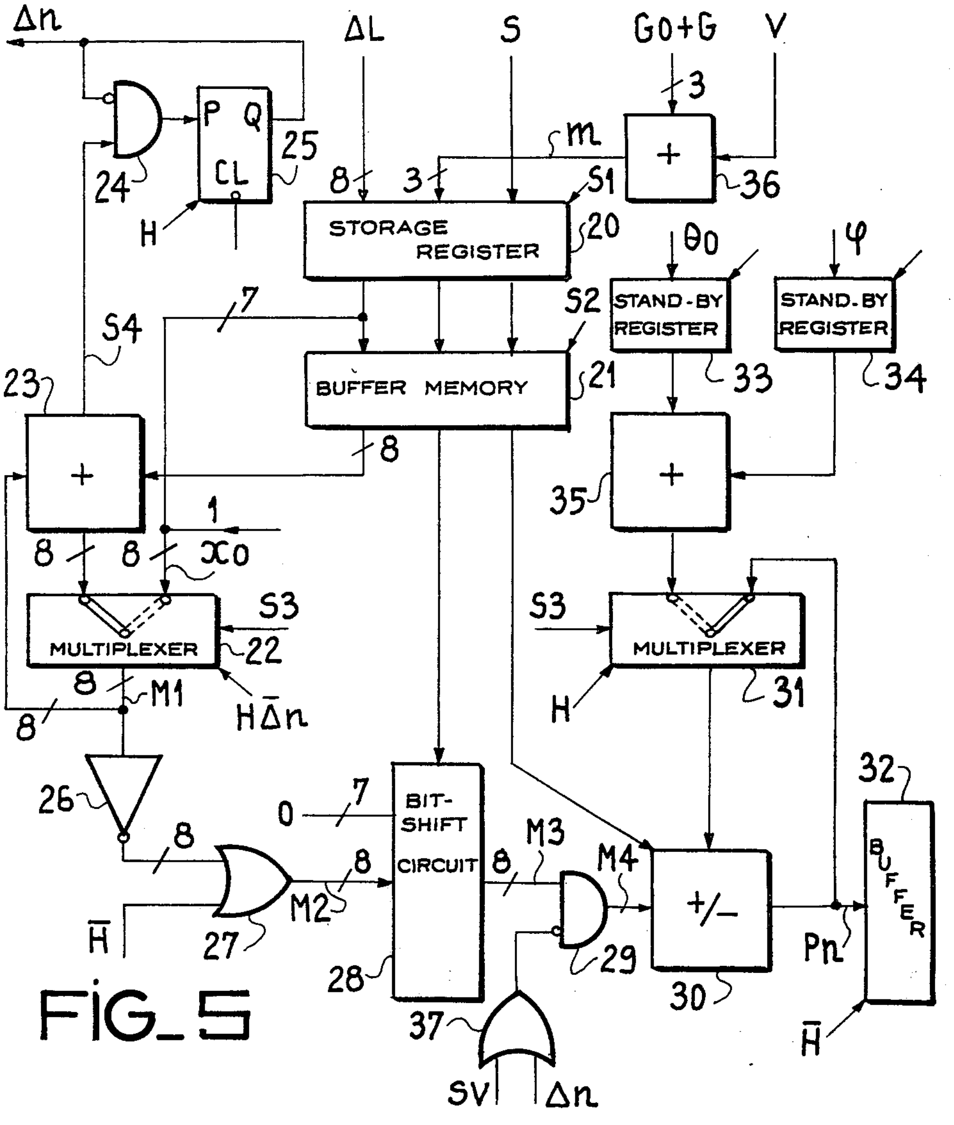
FIG_5
FIG_6
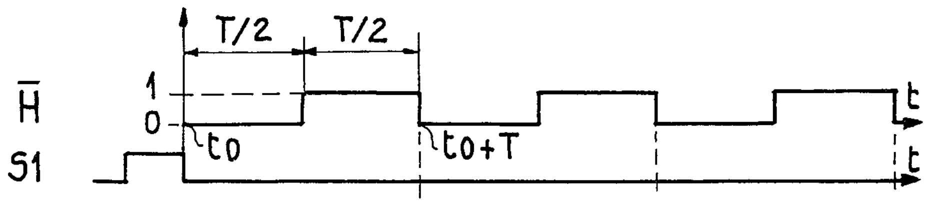

CURVE-GENERATING DEVICE FOR VISUAL DISPLAY OF SYMBOLS ON A CATHODE-RAY SCREEN

This invention relates to a device for generating curves representing symbols in the form of circles or vectors, more particularly for display on the screen of a cathode-ray tube.

The invention is thus applicable to cathode-ray tube display systems such as in particular graphic display consoles and electronic navigation display systems.

In these systems, a digital computer supplies data to a curve-generating device in order to produce the deflection signals corresponding to display of the different symbols. Scanning of the tube is of the random type in which the symbol being presented is drawn directly by the cathode-ray beam. The different symbols are displayed one after the other in an order which is established beforehand during an image scan of the tube.

In order to relieve the computer and to avoid overloading from a time standpoint with repeated calculations and from a volume standpoint by means of high-capacity memories, these systems make use in known manner of a buffer memory which contains the words of the data to be displayed. These words are delivered initially by the computer which is subsequently required to transfer only the replacement words corresponding to modifications of data. Reading of the memory takes place at the same rate as image scanning of the tube during which visualization of all the different data to be displayed takes place. The data extracted successively from the memory are usually converted by decoding and applied to the curve generator.

The curve-generating device consists of circuits for carrying out operational processes corresponding to parametric equations or algorithms determined as a function of the different symbols to be displayed and constituted by vectors or curves of higher degree such as circles, ellipses, conics or alphanumeric characters.

The generating device according to the invention is more particularly concerned with the production of signals for the representation of circular symbols and also makes it possible to present linear symbols or vectors. Processing can be either of the analog or logical type according as the data obtained from the computer are converted or not prior to application to the generating device. Whatever alternative is adopted, solution of the problem entails the need for circuits which are of greater complexity as the degree of refinement is greater, or in other words as the precision required for the plotting operation is higher, in which case the algorithms corresponding to circles become highly complex.

A primary aim of the invention is to provide a curve-generating device which permits high accuracy of plotting, this being achieved by means of circuits which are relatively simple since they result from the application of an original method of drawing or plotting which involves simple algorithms.

According to one distinctive feature of the invention, there is provided a device for generating circular symbols and comprising digital computation means for establishing a parameter ΔL defined by the relations $$R = \frac{U + \Delta L}{\theta} \text{ and } O \leqq \Delta L < U$$

where

U is the predetermined value of an elementary vector, $\theta$ is a predetermined value of angle at the center of a regular polygon of side $L = U + \Delta L$ circumscribed about the circle, $\theta$ being of the form $(2\pi)/(2^m)$, and logic circuits for operational processing in which are grouped together a first resolding summation circuit $x_n = x_{n-1} + \Delta L \cdot \overline{\Delta}_{n-1} - U \cdot \Delta_{n-1}$ with $x_o$ of predetermined value between O and L, a circuit for establishing the binary factor $\Delta_n$ equal to 1 in respect of $x_n$ higher than or equal to U, a multiplier circuit for solving $\alpha_n = x_{n-1} - \theta / U \cdot \overline{\Delta}_{n-1}$, a second summation circuit for solving $\theta_n = \theta_{n-1} + \theta \cdot \overline{\Delta}_{n-1}$ and a third summation circuit for delivering the polar angle value $P_n = \theta_n - \alpha_n$ of the outline formed by successive elementary vectors terminating in the polygon of side L.

Other features and advantages of the invention will be more apparent upon a consideration of the following description and accompanying drawings in which:

FIGS. 1 to 3 are diagrams relating to the method employed in a curve-generating device according to the invention;

FIGS. 5 and 6 are diagrams showing one example of construction of processing logic circuits of the curve-generating device and related waveforms.

Figure 4:
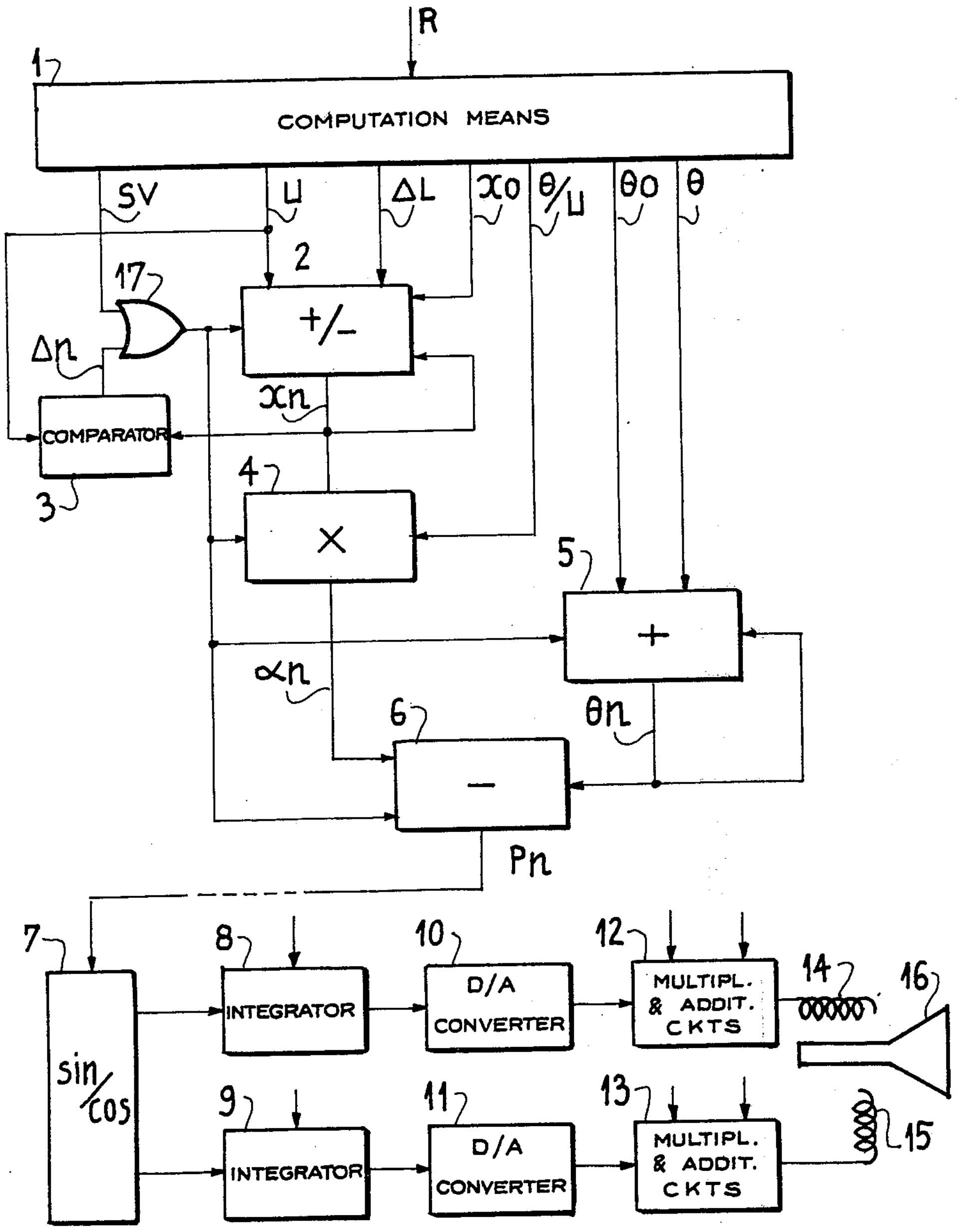
FIG. 4 is a general diagram of a curve-generating device according to the invention.

The pattern drawn on the screen of a cathode-ray tube is constituted in known manner by a series of elementary vectors having a short length U which is constant in respect of the drawing speed considered. The succession of directions of these successive elementary vectors determines the type of pattern outline, namely a straight line in the case in which the symbol to be presented is a vector or a curve in the case of a circle, for example.

A circle is drawn according to the invention by seeking to reproduce a regular polygon circumscribed about the circle as shown in FIG. 1 and having an angle at the center $\theta$ of predetermined value and a side having the value $L = U + \Delta L$ with the condition $O \leqq \Delta L < U$.

The relation between the radius R of the circle to be drawn and the parameter L results from $$R = \frac{L}{2 \, tg \, \theta/2},$$

the angle at the center $\theta$ being chosen so as to be of sufficiently small value to permit the conventional approximations $\cos \theta = 1$ and $\sin \theta = tg \, \theta = 0$.

From this it accordingly follows that $$R \simeq \frac{U + \Delta L}{\theta} = \frac{U}{\theta}\left[1 + \frac{\Delta L}{U}\right]$$

which determines a range of variation in the parameter R from the value $$R_0 = \frac{U}{\theta} \text{ to } R_1 = \frac{2U}{\theta}$$

as shown in FIG. 2.

The ratio of the end radii $R_1/R_2$ is equal to 2 and the range of variation $R_0$ and $R_1$ may prove insufficient for operational requirements. In order to overcome this difficulty, a second range $R_1$ and $R_2$ is determined in accordance with the invention by considering a second value $\theta 2$ having an angle at the center which is one-half the value of the initial angle at the center $\theta 1$ corresponding to the first range $R_0$ and $R_1$. A number of ranges can thus be determined in succession by dividing each time by 2 the value of the angle at the center $\theta$, the maximum radius being doubled each time. The number of ranges is determined as a function of the total range of variation to be covered. FIG. 3 shows by way of example three ranges for the values of angle at the center $$\theta_1,\ \theta_2 = \frac{\theta_1}{2} \text{ and } \theta_3 = \frac{\theta_2}{2} = \frac{\theta_1}{2^2}.$$

The parameter $\theta$ can thus be written in the form $$\theta = \frac{2\pi}{2^m},$$

where m is a whole number of the form $G_o+G$, where $G_o$ is a non-zero constant and where G varies from 0 to a predetermined value K in order to produce K+1 ranges of variation. The first range corresponds to the value $$\theta_1 = \frac{2\pi}{2^{Go}}$$

and the last range corresponds to $$\theta_{K+1} = \frac{2\pi}{2^{Go+K}} = \frac{\theta 1}{2^K}.$$

The ratio between the end radii of the total range of variation is $$\frac{R_K}{R_O} = 2^K,$$

namely 256 in respect of K=7. The resolution in the case of $\Delta L$ is equal to $U.2^K$.

The pattern outline cannot usually be drawn with accuracy since it is produced by means of elementary vectors having a fixed length U which is usually different from the length L of the side of the thoeretical polygon defined earlier.

The condition laid down in the method according to the present invention is that each elementary vector terminates at a point which forms part of the theoretical polygon of side L considered. If $x_n$ designates the distance between the end of the $n^{th}$ elementary vector and the following vertex of the polygon, it is stipulated that, when said distance $x_n$ is greater than or at least equal to the value U, the elementary vector of order n+1 is drawn exactly along the side of the polygon; in the contrary case or in other words when $x_n$ is smaller than U, the vector n+1 is drawn according to the polar angle of the following side of the polygon as corrected by an angle $\alpha_{n+1}$.

The following relations result from the foregoing: when $x_{n-1} \geqq U$, $\alpha_n=0$ and $x_n=x_{n-1}-U$ and when $x_{n-1}<U$, $$\alpha_n = \text{Arc sin}\left[\frac{x_{n-1}}{U}\cdot \sin\theta\right]$$

and $$x_n=L-(U\cdot\cos\alpha_n-x_{n-1}\cdot\cos\theta)$$

The two values last mentioned can be approximated and written:

$$\alpha_n = x_{n-1}\cdot\frac{\theta}{U} \text{ and } x_n = x_{n-1} + \Delta L.$$

An initial value $x_o$ is chosen for the beginning of the outline or plot, for example $x_o=L/2$ as shown in FIG. 1 in which the line begins at the center I of a first side AB of the theoretical polygon of side L.

The non-corrected polar angle $\theta_n$ of the line, namely the angle corresponding to the direction of the corresponding side of the theoretical polygon of side L, establishes the relations:

$$\theta_n=\theta_{n-1} \text{ in respect of } x_{n-1}\geqq U$$

and $$\theta_n=\theta_{n-1}+\theta \text{ in respect of } x_{n-1}<U$$

This angle is corrected by the above-mentioned value $\alpha_n$ in order to obtain the real direction of the line $P_n=\theta_n-\alpha_n$.

The parameter $\theta_n$ has an initial value $\theta_o=P$ corresponding to the polar angle offered by the first side of the polygon. Thus in the case of FIG. 1, the value P is equal to the angle which the direction AB makes with a angle-measurement reference direction (not shown).

The algorithm of the line is deduced from the foregoing relations by utilizing the binary factor $\Delta_{n-1}$ by convention equal to 1 in respect of $x_{n-1}\geqq U$ and equal to 0 in respect of $x_{n-1}<U$ in order to facilitate the writing operation.

This gives rise to the following result:

$$x_n=x_{n-1}+\Delta L\cdot\bar{\Delta}_{n-1}-U\cdot\Delta n-1$$

$$\alpha_n=x_{n-1}\cdot\theta/U\cdot\Delta_{n-1}$$

$$\theta_n=\theta_{n-1}+\theta\cdot\Delta n-1$$

$$P_n=\theta_n-\alpha_n$$

It is worthy of note that the formulation of the angles has pre-supposed an outline plotted in the negative direction (as shown in FIG. 1), namely the direction opposite to the conventional trigonometric direction. In a more general manner, we may write:

$$P_n = \theta_{n-1} + S\cdot\theta\cdot\left[1-\frac{x_{n-1}}{U}\right]\cdot\bar{\Delta}_{n-1}$$

where the factor S is equal to 1 or −1 according to the plotting direction chosen.

The construction of the curve-generating device can be carried out in many different ways. The essential means corresponding to the general algorithm of the line have been designated in the general diagram of FIG. 4 without reference to time synchronization on grounds of enhanced simplicity.

Calculating means 1 forming part of an auxiliary digital computer establish the parameter $\Delta L$ as a function of the displayed or programmed radius R and also deliver the data U and $\theta$ (or m), the initial angular value $\theta_o$ and, additionally, $$x_o = \frac{U + \Delta L}{2} \text{ and } \theta/U$$

which result from simple calculations.

Processing is preferably of the digital type and the corresponding logic circuits comprise: a first summation circuit 2 which performs the summation relating to $x_n$, a circuit 3 which produces the factor $\Delta_n$ by comparison of the values U and $x_n$, a multiplier circuit 4 for resolving $\alpha_n$, a second summation circuit 5 which produces $\theta_n$ and a third summation circuit 6 which delivers the polar angle $P_n$ or real direction of the plotted line.

The signal $P_n$ is then processed in known manner in auxiliary circuits comprising a sine-cosine table 7 which delivers the values sin $P_n$ and cos $P_n$ respectively to integrating circuits 8 and 9 in which the integration time corresponds to that of the symbol to be drawn. This time-duration is controlled and determined by the computer by utilizing such means as bidirectional counting means supplied by a clock signal, for example.

In the application to a visual display system on the screen of a cathode-ray tube, the downstream circuits can consist of digital-to-analog conversion circuits 10 and 11 which either precede or follow conventional multiplication and addition circuits 12 and 13 for producing the format and initial positioning of the line. The initial coordinates and operators are also supplied by the computer. The resultant deflection signals supply beam-deflecting elements 14 and 15 of the cathode-ray tube 16.

As can be observed, a linear vector plot is obtained simply by correcting to "1" the value $\Delta_n$ of control of circuits 2, 4, 5 and 6 with a view to maintaining constant the polar direction of the line. This can be obtained by means of a control signal SV delivered by the computer and transmitted through an AND gate circuit 17 which receives the value $\Delta_n$ via a second input. The signal SV has the value of "1" in the case of a vector plot and when $P_n=\theta_o$, its value has fallen to "0" in the case of a circle plot.

One example of construction of processing logic circuits is illustrated in FIG. 5 and comprises a first storage register 20 or stand-by register which receives from the auxiliary computer the digital data ΔL, m relating to the radius R as well as the plotting-direction datum S. The data are written in parallel in the register 20 as soon as this latter receives a loading signal S1 (shown in FIG. 6). It is considered that the transferred word consists of eight bits in the case of the datum ΔL, three bits in the case of the parameter m which defines the angle at the center $\theta$ and one bit in the case of the parameter S. A second register 21 constitutes a buffer memory. On reception of a loading pulse S2, the data ΔL, m and S are transferred into the register 21. The data relating to the circle or vector symbols can then be written in the register 20. A circuit 22 made up of a multiplexer and a register is initially loaded at the value $$x_o = \frac{U + \Delta L}{2}.$$

Said circuit then receives the output of an addition circuit 23 which is in turn supplied from the output of the register 22 and with the value ΔL of the register 21. The weight of the registers 20, 21, 22 is U length of the elementary vector. The value $x_o$ is produced by means of the seven bits of largest weight of ΔL and one bit "1". The control S3 is applied for the purpose of initializing the contents of the register 22 at $x_o$; and then the output of the summation device 23 remains connected to the register which is controlled periodically by the signal $H\Delta_n$, $\overline{H}$ being the clock signal shown in FIG. 6. The factor $\Delta_n$ is produced by means of an AND-circuit 24 of a flip-flop PQ 25. Integration of the error in length ΔL takes place within the register 22. Overflow of the integrator is stored by the signal S4 within the flip-flop 25 which produces $\Delta_n$. According to the value 0 or 1 of $\Delta_{n-1}$, the contents of the register 22 are increased by ΔL or reduced by U and the flip-flop is reset to 0, which in fact establishes the first relation of the algorithm. The contents M1 of the register 22 having a weight $2^8$ considered as a whole number represents $$2^8 \cdot \frac{x_{n-1}}{U}.$$

The other relations of the algorithm are established by means of a complement circuit 26 of an OR-gate 27 of a bit-shift circuit 28, of an AND gate circuit 29 and of a summation unit 30 and multiplexer-register 31 which is similar to the unit 23 and 22. The clock signal $\overline{H}$ is equal to "0" during a first half-period and to "1" during the following half-period (FIG. 6). The signal M2 at the output of the OR gate circuit 27 is constituted by the contents of the register M1 complemented at 26 when $\overline{H}=0$ and, during the following half-period when $\overline{H}=1$, a word composed of eight "1" bits is formed. The shift introduced by the circuit 28 is a function of the value of the parameter m which can have eight different values from $M=G_0$ to $m=G_o+G$, where G varies from 0 to 7. The inputs of the circuit 28 comprise seven "0" bits and the word M2 is made up of eight bits derived from the circuit 27. This arrangement is such that the word M3 recovered at the output of the circuit 28 represents the value $\theta$m in respect of the value M considered when $\overline{H}=1$ and the product M1. $\theta$ in respect of $\overline{H}=O$. The number represented by M3 is corrected to 0 by the AND gate circuit 29 when $\Delta_{n-1}=1$; otherwise said number is presented to the summation device 30, the incidence carry value of which is "1". The initial value $\theta_o$ is introduced into the integrating register 31 and either added or subtracted at the output M4 of the AND-circuit 29 according to the sign of the parameter S of plotting direction. The output of the summing device 30 is connected as a feedback loop to the register 31 in order to produce the value $P_n$ corresponding to the algorithm. The polar angle value $P_n$ is transmitted downstream through a buffer register circuit 32.

The other circuits shown comprise stand-by registers 33 and 34 in which are written respectively the initial value $\theta_o$ and an image rotation value $\phi$. This value $\phi$ is added to the value $\theta_o$ by means of a summation circuit 35.

In order to make a linear plot or in other words to represent a vector by a succession of elementary vectors, the number M4 at the output of the gate circuit 29 is corrected to "0" by the signal SV applied to the AND gate circuit 29 by means of an OR gate circuit 37 which receives the signal $\Delta_n$ via its second input. Thus the output value $P_m$ retains the initial value $\theta_o$ or $\theta_o+\phi$ in the case of an image rotation through an angle $\phi$.

An important advantage of the invention lies in the fact that it permits plotting of circles at constant velocity irrespective of the circle diameter within a total range of variation $R_O$ to $R_K$, the ratio of end radii being equal to $2^8$ in the example considered.

A change of speed may prove necessary, for example because the number of symbols to be represented becomes very high or alternatively as a result of a change of colors in the case of a color representation with a three-gun color tube. In order to satisfy this condition, the velocity parameter V is introduced into the exponent m in order to vary the velocity in a ratio of 2 each time; and the range of circles G is added beforehand to the velocity in a summation circuit 36 which makes it possible to compensate for the effect of size of the elementary vector on the radius of the plotted circle. The parameter $\theta$ is thus of the form $$\theta = \frac{2\pi}{2^{(Go+G-V)}}$$

The parameter m is accordingly doubled when the velocity is reduced by one-half. This is tantamount to reducing the angle $\theta$ by one-half and utilizing smaller elementary vectors in order to retain the same radius value on the screen.

The circular-arc plot is obtained by controlling the time of integration in the integrating circuits 8 and 9 by means of the auxiliary computer which is programmed accordingly.

The particular method employed in a curve-generating device according to the invention is distinguished by the fact that a practically continuous variation of the radius R desired for the circle to be displayed is obtained over a wide range of variation by utilizing a binary variation in the parameter $\theta$ of angle at the center and also utilizing if necessary a binary variation in the value U of the elementary vector coupled with a binary variation in the plotting velocity V; the corresponding digital processing operation is carried out in a relatively simple logical unit of small overall size which is therefore particularly well-suited to constitute airborne equipment and to be integrated in an electronic navigation display system.

What is claimed is:

1. A curve-generating device for visual display of symbols on a cathode-ray screen and especially circular symbols, comprising:

digital computation means for establishing a parameter $\Delta L$ defined by the relationship, $$R = \frac{U + \Delta L}{\theta} \text{ and } O \leqq \Delta L < U$$

where R is the radius of said circular symbol to be displayed, U is a predetermined value of an elementary vector, and $\theta$ is a predetermined value of angle at the center of a regular polygon of side $L=U+\Delta L$ circumscribed about the circle of radius R; and operational processing logic circuits including:

(a) first adder means having a first input means for receiving the data U, $\Delta L$ and $X_o$ wherein $X_o$ is a predetermined value between 0 and L; output means for outputting a signal $X_n$; comparator means for comparing said outputted $X_n$ signal with data U and producing a data signal $\Delta_n$ signal whereby said first adder output $X_n$ signal satisfies the equation:

$$X_n = X_{n-1} + \Delta L \cdot \overline{\Delta}_{n-1} - U \cdot \Delta_{n-1}$$

(b) multiplier means for receiving the data $X_n$, $\theta$, U and $\Delta_n$ outputting a signal $\alpha_n$ staisfying the equation $$\alpha_n = X_{n-1} \cdot (\theta) \cdot / (U) \cdot \Delta_{n-1}$$

(c) second adder means for receiving the data $\theta$, $\theta_o$ and $\Delta_{n-1}$ and outputting a signal $\theta_n$ which satisfies the equation $$\theta_n = \theta_{n-1} + \theta \cdot \overline{\Delta}_{n-1}$$

(d) third adder means for receiving the data $\theta_n$ and $\alpha_n$ and outputting a signal $P_n$ which is the polar angle value of the outline formed by successive elementary vectors terminating in said polygon of side L and which satisfies the equation $$P_n = \theta_n - \alpha_n.$$

2. A device according to claim 8, wherein the value of angle at the center $\theta$ is determined by a parameter m according to the relation $$\theta = \frac{2\pi}{2^m}$$

where $m=Go+G$, Go being a whole number and G being a number varying between O and K so as to define a total range of variation of the radius R between Ro ($m=Go$) and RK ($m=Go+K$) with $$\frac{RK}{RO} = 2^K.$$

3. A device according to claim 2, wherein the computation means produce in addition a binary factor S which is representative of the direction of the plot and a binary signal SV in which one state corresponds to a linear plot of vectors and the other state corresponds to a circle plot, the factor $\Delta n$ being transmitted via an OR-gate which also receives said signal SV.

4. A device according to claim 3, wherein the processing logic circuits comprise a storage register for receiving the data $\Delta L$, m and S, a first summation circuit for receiving $\Delta L$ from said register via a first input, the second input and the output of said first summation circuit being connected respectively to the output and to a first input of a first multiplexer-register circuit having a second input which receives the initial value $x_o$ and an output connected through a second OR gate to two inputs of a bit-shifting circuit which receives the datum m from said register, the second input of said second OR gate being adapted to receive a clock signal, the shift circuit being connected to a second summation circuit through an AND gate circuit having two inputs, the second input of said gate circuit being supplied by the output of the OR gate which receives $\Delta n$ and SV, the second summation circuit being adapted to receive the datum S from said register in order to represent the sign of the summation and being connected through another input to the output of a second multiplexer-register circuit which receives through a first input an initial polar angle datum $\theta_o$ of the plot and being connected through a second input to the output of the second summation circuit which delivers the polar angle information $P_n$ of the plot.

5. A device according to claim 4, wherein the parameter m is of the form $m=Go+G-V$ involving the use of a whole number V representing the plotting velocity, the values Go+G and V being produced by the computation means and applied respectively to the two inputs of a summation circuit which delivers m.

6. A device according to claim 5, wherein said device further comprises a second register for receiving the initial datum $\theta_o$, a third register for receiving an image rotation datum $\phi$, a third summation circuit which is supplied from the outputs of said second and third registers and the output of which is connected to the first input of the second multiplexer-register circuit.

7. A device according to claim 1 as applied to visual display of linear and circular symbols on a cathode-ray screen, wherein the polar angle value $P_n$ of the plot is transmitted through a buffer register circuit to a memory circuit forming a sine-cosine table which supplies integrating circuits, the integration time of said circuits being controlled by a digital computer comprising said computation means.

8. A curve-generating device for visual display of symbols on a cathode-ray screen and especially circular symbols, comprising:

digital computation means for establishing a parameter $\Delta L$ defined by the relations $$R = \frac{U + \Delta L}{\theta} \text{ and } O \leqq \Delta L < U$$

where R is the radius of said circular symbol, U is the predetermined value of an elementary vector, $\theta$ is a predetermined value of angle at the center of a regular polygon of side $L=U+\Delta L$ circumscribed about the circle of radius R;

and operational processing logic circuits in which are grouped together:

a first summation means for solving $$x_n=x_{n-1}+\Delta L\cdot\overline{\Delta}_{n-1}-U\cdot\Delta_{n-1}$$

with $x_o$ of predetermined value between O and L, a circuit for establishing the binary factor $\Delta_n$ equal to "1" in respect of $x_n$ higher than or equal to U, a multiplier means for solving $$\alpha_n=x_{n-1}\cdot(\theta)/(U)\cdot\overline{\Delta}_{n-1}$$

a second summation means for solving $$\theta_n=\theta_{n-1}+\theta\cdot\overline{\Delta}_{n-1}$$

and a third summation means for delivering the polar angle value $P_n=\theta_n-\alpha_n$ of the outline formed by successive elementary vectors terminating in the polygon of side L, wherein the value of angle at the center $\theta$ is determined by a parameter m according to the relation $\theta=(2\pi)/(2^m)$ where $m=Go+G$, Go being a whole number and G being a number varying between O and K so as to define a total range of variation of the radius R between Ro ($m=Go$) and RK ($m=Go+K$) with $$\frac{RK}{RO} = 2^K,$$

wherein the computation means produce in addition a binary factor S which is representative of the direction of the plot and a binary signal SV in which one state corresponds to a linear plot of vectors and the other state corresponds to a circle plot, the factor $\Delta n$ being transmitted via an OR-gate which also receives said signal SV, and wherein the processing logic circuits comprise a storage register for receiving the data $\Delta L$, m and S, a first summation circuit for receiving $\Delta L$ from said register via a first input, the second input and the output of said first summation circuit being connected respectively to the output and to a first input of a first multiplexer-register circuit having a second input which receives the initial value $x_o$ and an output connected through a second OR gate to two inputs of a bit-shifting circuit which receives the datum m from said register, the second input of said second OR gate being adapted to receive a clock signal, the shift circuit being connected to a second summation circuit through an AND gate circuit having two inputs, the second input of said gate circuit being supplied by the output of the OR gate which receives $\Delta n$ and SV, the second summation circuit being adapted to receive the datum S from said register in order to represent the sign of the summation and being connected through another input to the output of a second multiplexer-register circuit which receives through a first input an initial polar angle datum $\theta_o$ of the plot and being connected through a second input to the output of the second summation circuit which delivers the polar angle information $P_n$ of the plot.

9. A curve-generating device for visual display of symbols on a cathode-ray screen and especially circular symbols, comprising:

digital computation means for establishing a parameter $\Delta L$ defined by the relations $$R = \frac{U + \Delta L}{\theta} \text{ and } O \leqq \Delta L < U$$

where R is the radius of said circular symbol, U is the predetermined value of an elementary vector, $\theta$ is a predetermined value of angle at the center of a regular polygon of side $L=U+\Delta L$ circumscribed about the circle of radius R, and operational processing logic circuits in which are grouped together:

a first sumation means for solving $$x_n=x_{n-1}+\Delta L\cdot\overline{\Delta}_{n-1}-U\cdot\Delta_{n-1}$$

with $x_o$ of predetermined value between O and L, a circuit for establishing the binary factor $\Delta_n$ equal to "1" in respect of $x_n$ higher than or equal to U, a multiplier means for solving $$\alpha_n=x_{n-1}\cdot(\theta)/(U)\cdot\overline{\Delta}_{n-1}$$

a second summation means for solving $$\theta_n=\theta_{n-1}+\theta\cdot\overline{\Delta}_{n-1}$$

and a third summation means for delivering the polar angle value $P_n=\theta_n-\alpha_n$ of the outline formed by successive elementary vectors terminating in the polygon of side L, wherein the value of angle at the center $\theta$ is determined by a parameter m according to the relation $\theta=(2\pi)/(2^m)$ where m=Go+G, Go being a whole number and G being a number varying between O and K so as to define a total range of variation of the radius R between Ro (m=Go) and $$RK\ (m = Go + K)\ \text{with}\ \frac{RK}{RO} = 2^K,$$

wherein the computation means produce in addition a binary factor S which is representative of the direction of the plot and a binary signal SV in which one state corresponds to a linear plot of vectors and the other state corresponds to a circle plot, the factor Δn being transmitted via an OR-gate which also receives said signal SV, wherein the processing logic circuits comprise a storage register for receiving the data ΔL, m and S, a first summation circuit for receiving ΔL from said register via a first input, the second input and the output of said first summation circuit being connected respectively to the output and to a first input of a first multiplexer-register circuit having a second input which receives the initial value $x_o$ and an output connected through a second OR gate to two inputs of a bit-shifting circuit which receives the datum m from said register, the second input of said second OR gate being adapted to receive a clock signal, the shift circuit being connected to a second summation circuit through an AND gate circuit having two inputs, the second input of said gate circuit being supplied by the output of the OR gate which receives Δn and SV, the second summation circuit being adapted to receive the datum S from said register in order to represent the sign of the summation and being connected through another input to the output of a second multiplexer-register circuit which receives through a first input an initial polar angle datum $\theta_o$ of the plot and being connected through a second input to the output of the second summation circuit which delivers the polar angle information $P_n$ of the plot, and wherein the parameter m is of the form m=Go+G−V involving the use of a whole number V representing the plotting velocity, the values Go+G and V being produced by the computation means and applied respectively to the two inputs of a summation circuit which delivers m.

10. A curve-generating device for visual display of symbols on a cathode-ray screen and especially circular symbols, comprising:

digital computation means for establishing a parameter ΔL defined by the relations $$R = \frac{U + \Delta L}{\theta}\ \text{and}\ O \leqq \Delta L < U$$

where R is the radius of said circular symbol, U is the predetermined value of an elementary vector, $\theta$ is a predetermined value of angle at the center of a regular polygon side L=U+ΔL circumscribed about the circle of radius R;

and operational processing logic circuits in which are grouped together:

a first summation means for solving $$x_n = x_{n-1} + \Delta L \cdot \bar{\Delta}_{n-1} - U \cdot \Delta_{n-1}$$

with $x_o$ of predetermined value between O and L, a circuit for establishing the binary factor $\Delta_n$ equal to "1" in respect of $x_n$ higher than or equal to U, a multiplier means for solving $$\alpha_n = x_{n-1} \cdot (\theta) / U \cdot \bar{\Delta}_{n-1}$$

a second summation means for solving $$\theta_n = \theta_{n-1} + \theta \cdot \bar{\Delta}_{n-1}$$

and a third summation means for delivering the polar angle value $P_n=\theta_n-\alpha_n$ of the outline formed by successive elementary vectors terminating in the polygon of side L, wherein the value of angle at the center $\theta$ is determined by a parameter m according to the relation $\theta=(2\pi)/(2^m)$ where m=Go+G, Go being a whole number and G being a number varying between O and K so as to define a total range of variation of the radius R between Ro (m=Go) and RK (M=Go+K) with $$\frac{RK}{RO} = 2^K,$$

wherein the computation means produce in addition a binary factor S which is representative of the direction of the plot and a binary signal SV in which one state corresponds to a circle plot, the factor Δn being transmitted via an OR-gate which also receives said signal SV, wherein the processing logic circuits comprise a storage register for receiving the data ΔL, m and S, a first summation circuit for receiving ΔL from said register via a first input, the second input and the output of said first summation circuit being connected respectively to the output and to a first input of a first multiplexer-register circuit having a second input which receives the initial value $x_o$ and an output connected through a second OR gate to two inputs of a bit-shifting circuit which receives the datum m from said register, the second input of said second OR gate being adapted to receive a clock signal, the shift circuit being connected to a second summation circuit through an AND gate circuit having two inputs, the second input of said gate circuit being supplied by the output of the OR gate which receives Δn and SV, the second summation circuit being adapted to receive the datum S from said register in order to represent the sign of the summation and being connected through another input to the output of a second multiplexer-register circuit which receives through a first input an initial polar angle datum $\theta_o$ of the plot and being connected through a second input to the output of the second summation circuit which delivers the polar angle information $P_n$ of the plot, wherein the parameter m is of the form m=Go+G−V involving the use of a whole number V representing the plotting velocity, the values Go+G and V being produced by the computation means and applied respectively to the two inputs of a summation circuit which delivers m, wherein said device further comprises a second register for receiving the initial datum $\theta_o$, a third register for receiving an image rotation datum $\psi$, a third summation circuit which is supplied from the outputs of said second and third registers and the output of which is connected to the first input of the second multiplexer-register circuit.

* * * * *